United States Patent [19]

Hill

[11] Patent Number: 5,111,704
[45] Date of Patent: May 12, 1992

[54] APPARATUS AND METHOD FOR SIMULATING BLADE PASS SENSOR SIGNALS

[75] Inventor: Peter D. Hill, Monroeville, Pa.

[73] Assignee: Westinghouse Electric Corp., Pittsburgh, Pa.

[21] Appl. No.: 574,977

[22] Filed: Aug. 30, 1990

[51] Int. Cl.⁵ .......................................... G01M 19/00
[52] U.S. Cl. .................................... 73/866.4; 73/660; 364/571.08
[58] Field of Search .......... 73/1 DV, 1 R, 660, 866.4; 364/571.01-571.08; 367/13

[56] References Cited

U.S. PATENT DOCUMENTS

| | | | |
|---|---|---|---|
| 3,641,550 | 2/1972 | Lynas et al. | 73/579 X |
| 4,389,891 | 6/1983 | Fournier | 73/573 |
| 4,426,641 | 1/1984 | Kurihara et al. | 73/660 X |
| 4,439,831 | 3/1984 | Sinclair | 324/335 X |
| 4,573,358 | 3/1986 | Luongo | 73/660 |
| 4,593,566 | 6/1986 | Ellis | 73/660 |
| 4,729,247 | 3/1988 | Brown | 73/866.4 |
| 4,887,468 | 12/1989 | McKendree et al. | 73/660 |
| 4,896,537 | 1/1990 | Osborne | 73/660 |
| 4,955,269 | 9/1990 | Kendig et al. | 73/660 X |

OTHER PUBLICATIONS

Development and Application of a Blade Vibration Monitor, P. F. Rozelle et al., Latest Advances in Steam Turbine Design, Blading, Repairs, Assessment and Condenser Interaction, PWR-vol. 7, ed. by D. M. Rasmussen, American Society of Mechanical Engineers, New York, 1989, pp. 37–45.

Primary Examiner—Tom Noland

[57] ABSTRACT

A processor provides N series of discrete values, with each series of discrete values approximating a sinusoidal signal and N being the number of sensors with which a BVM to be tested is normally used. N digital to analog converters are provided, each receiving one of the N series of discrete values and producing an analog signal therefrom. The analog signals have zero crossings incorporating known turbine blade vibration information. N filters are provided, with each filter being responsive to one of the converters for filtering the analog signals. Circuitry is provided for producing an output pulse simulating a once per revolution pulse. Clock circuitry is provided for producing clock pulses which are input to the N converters and the circuitry for producing the output pulse for synchronizing the operation of the converters with the operation of the circuitry producing the output pulse.

5 Claims, 2 Drawing Sheets

APPARATUS AND METHOD FOR SIMULATING BLADE PASS SENSOR SIGNALS

BACKGROUND OF THE INVENTION

1. Field of the Invention

The present invention is directed generally to analyzing the operating parameters of a steam turbine generator and, more specifically, to the simulation of data representative of the condition of the turbine generator.

2. Description of the Prior Art

Turbines or similar machines include one or more blade rows each including a plurality of radially extending blades connected to a rotating shaft member. A typical blade is of a complex design which results in multiple vibration modes. If the natural resonance of the blade in one or more of those modes should coincide with the machine's rated rotational speed, or harmonics thereof, then the blade will have a tendency to vibrate excessively about its normal position. When the amplitude of that vibration exceeds a certain level, objectionable stresses are set up in the blade. If the condition is not detected and remedied, the blade may eventually fracture resulting in an extremely costly forced outage of the machinery so that the problem may be corrected.

Monitoring of blade vibration in machines already in operation is extremely important because different pressure and temperature conditions can change a blade's vibrational modes. One widely used method which tests for excessive blade vibration uses strain gages affixed to the rotating blades. Sensor information is communicated to analyzing equipment outside the machine by means of miniature transmitters affixed to the machine's rotating shaft at various locations.

Although that arrangement provides for highly accurate results, it is limited in that only a certain number of the blades can be tested at any one time due to the limited number of transmitters that can be accommodated inside the machine. To test all of the blades thus requires that the machine be shut down each time a new group of blades is to be tested so that the sensors may be properly affixed. The cost of the transmitters, and even the batteries therefore, is abnormally high since they must be of special design to withstand the extremely hostile environment inside the turbine. The high cost of equipment, in addition to labor costs, make that testing method prohibitive for many plant operators.

To obviate such problems, another testing method utilizes permanently installed, non-contacting proximity sensors to detect blade tip movement. One example of such an apparatus is disclosed in U.S. Pat. No. 4,573,358.

In that apparatus, a plurality of sensors is equally spaced about the periphery of a blade row. Each sensor is of the type which provides an output signal as a blade passes it. Signal conditioning is provided for each sensor to convert its output signal into a corresponding narrow pulse signal. A particular blade to be monitored is entered into a blade select circuit by an operator while another circuit is provided for combining all of the sensor output pulses. That combined output signal is input into a blade vibration monitor (BVM). The BVM analyses the sensor information to determine blade vibration.

Another type of BVM is disclosed in a paper entitled Development And Application Of A Blade Vibration Monitor published in *Latest Advances In Steam Turbine Design, Blading, Repairs, Assessment, And Condenser Interaction*, PWR-Vol. 7, edited by D. M. Rasmussen, American Society of Mechanical Engineers, 1989 at pages 37-45. That paper demonstrates that a BVM can be developed around information derived from only two sensors per row.

Regardless of the construction of the BVM and the number of sensors producing input signals therefor, all BVM's have the characteristic of being complex and sophisticated. For that reason, the need exists for an apparatus and method for evaluating the proper operation of a BVM before it leaves the factory. Additionally, there is a need for a simple method of testing and calibrating BVM's after installation.

SUMMARY OF THE INVENTION

The present invention is directed to an apparatus and method for generating signals incorporating known turbine blade vibration information. The apparatus and method may be used to verify proper operation of a BVM before it leaves the factory and to test and calibrate a BVM after installation in the field.

The apparatus of the present invention includes a computer or processor for providing N series of discrete values, with each series of discrete values approximating a sinusoidal signal. N is the number of sensors with which the BVM to be tested is used during normal operation. Thus, the apparatus of the present invention produces the correct number of sensor signals for input to the BVM under examination. N digital to analog converters are provided, each receiving one of the N series of discrete values and producing an analog signal therefrom. The analog signals have zero crossings incorporating known turbine blade vibration information. N filters are provided, with each filter being responsive to one of the converters for filtering the analog signals. Circuitry is provided for producing an output pulse simulating a once per revolution pulse which is another signal typically input to a BVM. Clock circuitry is provided for producing clock pulses which are input to the N converters and the circuitry for producing the output pulse simulating a once per revolution pulse. The purpose of the clock pulse is to synchronize the operation of the converters with the operation of the circuitry producing the simulated once per revolution pulse.

The present invention is also directed to a method for generating signals incorporating known turbine blade vibration information. The method is comprised of the following steps: providing N series of discrete values, each series approximating a sinusoidal signal; converting each of said N series of discrete values into an analog signal, said analog signals having zero crossings incorporating known turbine blade vibration information; filtering said analog signals; producing an output pulse simulating a once per revolution pulse; and synchronizing said converting and producing steps.

The apparatus and method of the present invention can be used to simulate all of the input signals needed by the BVM. By incorporating within the signals input to the BVM known turbine blade vibration information, it is possible to determine if the BVM is properly operating. The simulation of signals incorporating known turbine blade vibration information can also be used for purposes of calibrating the BVM. The apparatus and method of the present invention may also be used as a tool for marketing BVM's. Those and other advantages and benefits of the present invention will become appar-

BRIEF DESCRIPTION OF THE DRAWINGS

For the present invention to be clearly understood and readily practiced, a preferred embodiment will now be described, by way of example only, with reference to the accompanying figures wherein.

DESCRIPTION OF A PREFERRED EMBODIMENT

Figure 1:
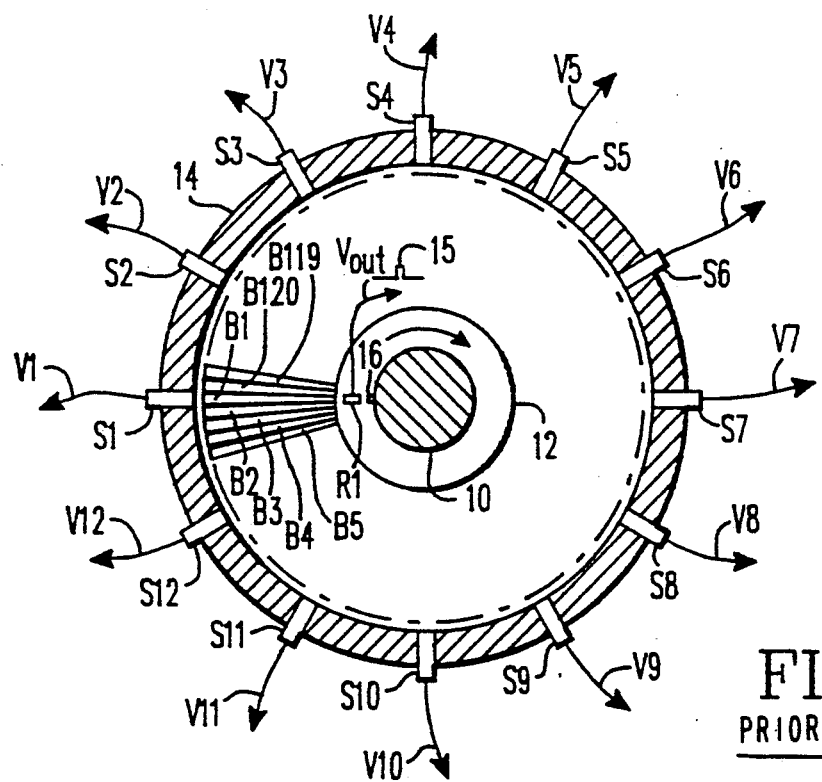
FIG. 1 is a simplified axial view of a turbine blade row illustrating a representative number of blades.

FIG. 1 illustrates a simplified axial view of a turbine blade row wherein a representative number of blades is illustrated. In the illustrated turbine blade row, seven blades B1-B5, B119, and B120 out of the typical one hundred twenty blades in a turbine blade row are illustrated. All of the blades in the blade row are connected to a rotating shaft 10 by means of a disk 12 in a known manner. Although the illustrated blade row is shown as having one hundred twenty blades, it is understood that such number is given merely by way of a typical example.

A plurality N of sensors is disposed about the periphery of the blade row with each sensor being operable to provide an output signal in a known manner as each blade passes it. In the example shown in FIG. 1, N is equal to twelve sensors S1-S12 and each sensor produces a sensor signal V1-V12, respectively. The sensors are evenly spaced about the entire periphery of the blade row. The sensors S1-S12 are rigidly held in their respective positions by means of a retainer 14 which may either be specially fabricated for a particular machine or may be part of the machine itself, such as the turbine casing.

FIG. 1 additionally illustrates a reference sensor R1 which, in conjunction with indicia 16 on shaft 10, is operable to provide an output signal Vout having a pulse 15 occurring once per shaft 10 revolution, i.e. an OPR pulse 15. Although not shown, it is known to provide an additional sensor operable in conjunction with a toothed wheel having sixty teeth to provide an output signal having sixty pulses per shaft revolution. Both the output signal Vout and the output signal having sixty pulses per revolution are common to many turbine systems and are utilized for control purposes.

Theory of Operation

In the absence of blade vibrations, the expected sensor signals V1-V12 from each of the sensors S1-S12, respectively, may be expressed as a function of time by the following equation:

$$V(t) = Sin\ (2\pi Bt/Topr - B\phi_i) \quad (1)$$

where
B is the number of blades;
t is the continuous time in seconds;
Topr is the time or period, in seconds, for one revolution; and
$\phi_i$ is the sensor position with respect to the position of the blade being monitored when an OPR pulse 15 is produced.

In the presence of vibrations, the time of the actual zero crossings for the sensor signal V(t) will vary by a small amount $\Delta t$ from the expected zero crossings. Thus, equation (1), in the presence of vibrations, becomes:

$$V(t) = Sin\ (2\pi B(t + \Delta t)/Topr - B\phi_i) \quad (2)$$

The Fourier series expression of $\Delta t$ is given by the following equation:

$$\Delta t = \alpha \left[ \sum_{k=1}^{M} \{d_{2k-1} Sin(2\pi h_k t/Topr) + d_{2k} Cos(2\pi h_k t/Topr)\} + d_{2M+1} \right] \quad (3)$$

where
$\alpha = Topr/R$;
R is the radius measured from the center of the turbine shaft 10 to the blade tip;
k is the harmonic index;
M is the number of harmonics of interest;
$d_{2k}, d_{2k-1}$ are the quadrature blade tip displacements for the kth and k−1 harmonics, respectively, in mils;
$h_k$ is the kth harmonic; and
$d_{2M+1}$ is the static tip displacement in mils.

The number of revolutions per second (RPS) may be controlled by varying the period between samples such that:

$$RPS = 1/Topr = 1/(LTs) \quad (4)$$

where L is the number of samples per revolution and Ts is the sampling period.

For discrete time implementation of equation (2), the continuous time index t is transformed using:

$$t = jTs \quad (5)$$

where j is the sample index.

Knowing that Topr=LTs from equation (4) and t equals jTs from equation (5), it can be shown that t/Topr in equation (2) equals j/L. Making that substitution in equations (2) and (3) and introducing $\Delta t(j)$ as the discrete time version of $\Delta t$, the discrete-time version V(j) of the sensor signal V(t) is given by:

$$V(j) = Sin\ (2\pi B(j/L + \Delta t(j)) - B\phi_i) \quad (7)$$

where $$\Delta t(j) = \left[ \sum_{k=1}^{M} \{d_{2k-1} Sin(2\pi h_k j/L) + d_{2k} Cos(2\pi h_k j/L)\} + d_{2M+1} \right] \quad (8)$$

Equations (8) and (3) are essentially the same but the term t/Topr in equation (3) has been replaced with j/L in equation (8).

From equation (8) it can be seen that $\Delta t(j)$ is calculated for each harmonic (M) of interest by providing values for the displacement terms $d_{2k-1}, d_{2k}$, and $d_{2M+1}$, and providing the number of samples per revolution (L). Having calculated a value for $\Delta t(j)$, a value for V(j) can be calculated from equation (7) by knowing the number of blades (B) and the sensor position with respect to the blade position when an OpR pulse 15 is produced.

Implementation

Figure 2:
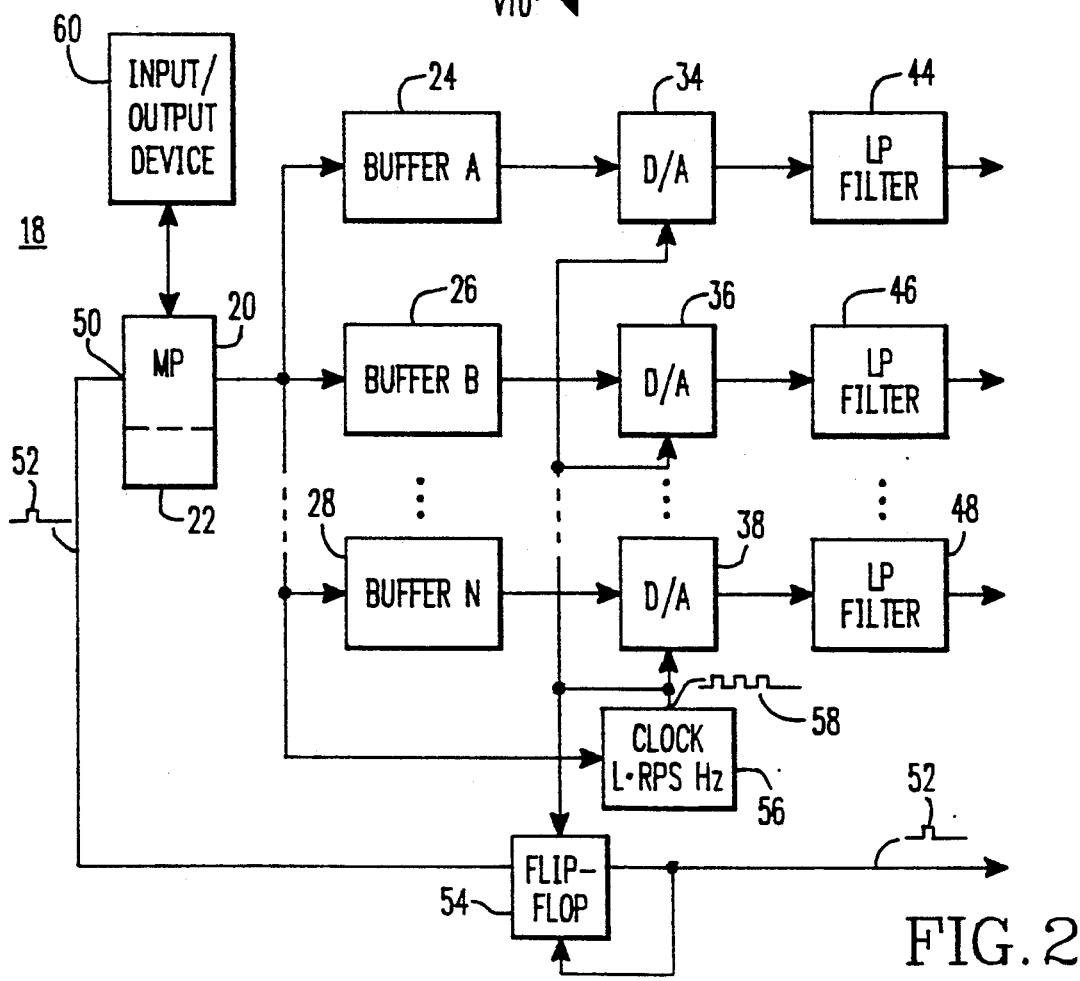
FIG. 2 is a block diagram of a diagnostic apparatus constructed, according to the teachings of the present invention.

A diagnostic apparatus 18 constructed according to the teachings of the present invention for implementing the previously discussed theory is illustrated in FIG. 2. The apparatus 18 is under the control of a microprocessor or personal computer 20. The microprocessor 20 has associated therewith memory 22 of the kind suitable for storing a program for solving equations (7) and (8). The creation of such a program requires nothing more than the application of known programming techniques and need not be discussed further. Also associated with the microprocessor 20 is a standard input/output device 60 such as a keyboard and CRT.

N buffers 24, 26, 28 are provided which are responsive to microprocessor 20. N is equal to the number of sensors for which the diagnostic apparatus 18 must simulate signals. Each of the N buffers 24, 26, 28 has a digital to analog converter 34, 36, 38, respectively, responsive thereto which may, for example, be a sixteen bit D/A converter. Each of the digital to analog converters 34, 36, 38 has a low pass filter 44, 46, 48, respectively, responsive thereto. The low pass filters 44, 46, 48 have a cut-off frequency starting at $(B \times RPS)$ Hz and has a stop band attenuation of 96dB for sixteen bit digital to analog converters at $1/(2Ts)$Hz.

The microprocessor 20 has a pin 50 which is capable of being toggled between a low and a high state. By controlling the times at which the pin 50 assumes the high state, an output signal available at pin 50 includes an output pulse 52 that simulates the OPR pulse 15. The microprocessor 20 may control the output signal available on pin 50 through a program that monitors the sample index. For example, if the number of samples (L) is 1200, the output on pin 50 may be set high when the sample index reaches 1200 and set low when the sample index is reset to one. However, how the output pulse 52 is produced is not an important feature of the present invention. Accordingly, any known technique for toggling pin 50 may be used.

The output pulse 52 is input to a flip-flop (bistable multivibrator) 54. A clock 56, controlled by microprocessor 20, produces clock pulses 58 having a frequency which is the number of samples per revolution (L) times the number of revolutions per second (RPS). The clock pulses 58 are input to each of the digital to analog converters 34, 36, 38 and to the flip-flop 54. The purpose of the clock pulses 58 is to synchronize the operation of the digital to analog converters 34, 36, 38 with the operation of the flip-flop 54. Thus, although the output pulse 52 is available at an input terminal of flip-flop 54, it is not output therefrom until the flip-flop 54 receives a clock pulse 58. In that manner, synchronization is achieved. Thereafter, the output pulse 52 may be used to reset the flip-flop 54.

An example of the operation of the diagnostic apparatus 18 will now be provided. Assume that the diagnostic apparatus 18 is to be used in conjunction with a BVM which is designed to receive signals produced by two sensors. Further, assume those sensors are S2 and S6 as shown in FIG. 1 and that the blade to be investigated is B1.

With a program for solving equations 7 and 8 stored in memory 22 of the microprocessor 20, the user inputs through input/output device 60 the following information to microprocessor 20:

B = 120
L = 1200
$\phi_{s1} = 30°$ corresponding to sensor S2,
$\phi_{s2} = 150°$ corresponding to sensor S6,
M = 1 and $h_1 = 3$ assuming that the 3rd harmonic is of interest, and
RPS = 60.

Known blade vibration information is supplied by the user through input/output device 60. For example:
$d_1 = 300$ mils and
$d_2 = 0$ mils for the third harmonic, and
$d_3 = 400$ mils for the static tip deflection.

Having been provided with the information needed to evaluate equations (7) and (8), the microprocessor 20 evaluates equation 8 with respect to the first sensor S2 to arrive at a value of $\Delta t(j)$ and then uses that value to evaluate equation (7) to arrive at a value of $V(j)$, where j is the sample index. That process is repeated such that the microprocessor 20 outputs a first series of discrete values each representative of the sensor signal V2 for different values of j. That series of discrete values is stored in buffer 24. That process is then repeated with respect to the second sensor S6 and a second series of discrete values representative of the signal V6 at various values of j is produced and stored in the buffer 26.

The digital to analog converter 34 and the digital to analog converter 36, synchronized by the clock 56, convert each of the discrete digital values into their analog counterparts, with each analog counterpart representing a piece of the continuous signal V2 or V6, respectively. The output of each of the digital to analog converters 34, 36 is input to its respective low pass filter 44, 46 which smooths the analog pieces to produce continuous sin wave signals V2 and V6, respectively. The signals V2 and V6 have zero crossings and the known blade vibration information is incorporated in those zero crossings. Those signals are input to the BVM.

Simultaneously with the production of the signals V2 and V6, the microprocessor 20 produces the output signal having OPR pulse 52 which, after being synchronized by flip-flop 54 as discussed above, is also input to the BVM. The OPR pulse 52 simulates the OPR pulse 15 produced by the sensor R1. The BVM, if functioning properly, will evaluate the signals input thereto and indicate that the blade is experiencing vibrations which correspond to the known vibration information incorporated in the signals V2 and V6.

The aforedescribed example involving two sensors can clearly be expanded to accommodate a BVM requiring input signals from N sensors.

Figure 3:
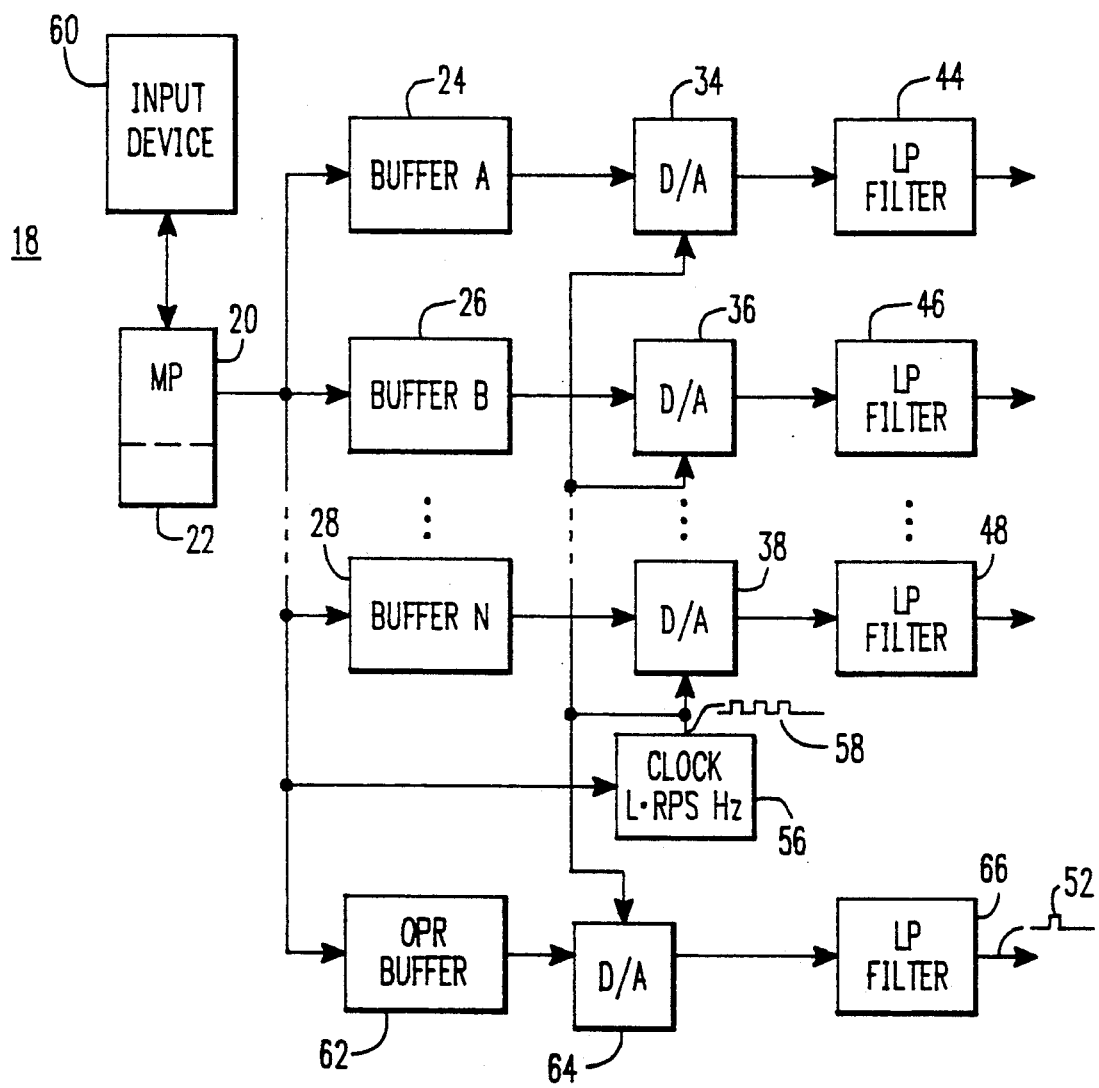
FIG. 3 is a block diagram of an alternative embodiment of a diagnostic apparatus constructed according to the teachings of the present invention.

An alternative embodiment of the diagnostic apparatus 18 is illustrated in FIG. 3. In FIG. 3, like components performing identical functions as those described in FIG. 2 are provided with the same reference numerals. A primary difference between the embodiment shown in FIG. 2 and the embodiment shown in FIG. 3 is in the generation of the OPR pulse 52. In the embodiment shown in FIG. 3, the microprocessor 20 may have a program for monitoring the sample index which outputs a "one" to an OPR buffer 62 for storage when the sample index reaches 1200. The information stored in the OPR buffer 62 is input to a digital to analog converter 64 which has a low pass filter 66 responsive thereto. The OPR buffer 62, digital to analog converter 64, and low pass filter 66 function in the same manner as previously described. However, the data being processed results in the production of the OPR pulse 52 rather than a simulated sensor signal. Even though the present invention has been tested by constructing and operating a diagnostic apparatus 18 as shown in FIG. 3, the embodiment shown in FIG. 2 has an advantage over the embodiment shown in FIG. 3 in that the OPR signal 52 is produced with an inexpensive flip-flop 54 rather than an expensive digital to analog converter 64.

The present invention is also directed to a method for generating signals incorporating known turbine blade vibration information. The method includes the steps of providing N series of discrete values with each series approximating a sinusoidal signal. Each of the N series of discrete values is converted into an analog signal. The analog signals have zero crossings incorporating known turbine blade vibration information. The analog signals are filtered for purposes of smoothing the waveform. A signal is produced which has a pulse simulating a once per revolution pulse. Clock pulses are produced which are used to synchronize the conversion of the discrete values to their analog counterparts with the production of the output pulse simulating the once per revolution pulse. Thereafter, the analog signals and the signal simulating the once per revolution pulse may be input to a BVM to ascertain the BVM's proper operation or for purposes of calibration.

While the present invention has been described in accordance with preferred embodiments thereof, it will be readily apparent to those of ordinary skill in the art that additional changes and modifications may be made. Such changes and modifications are intended to be covered by this specification and the following claims.

What is claimed is:

1. An apparatus for generating signals incorporating known turbine blade vibration information, comprising:
   first means for providing N series of discrete values, each series approximately a sinusoidal signal, said first means including processor means, memory means having a first portion for storing a program for solving an equation including several variables, and N buffer means, said processor means being responsive to said first portion of said memory means for performing the program to produce said N series of discrete values, each of said series being stored in one of said N buffer means;
   N converter means each for receiving one of said N series of discrete values and for producing an analog signal therefrom, said analog signals having zero crossings incorporating known turbine blade vibration information;
   N filter means each responsive to one of said N converter means for filtering said analog signals;
   means for producing an output pulse simulating a once per revolution pulse; and
   clock means for producing clock pulses, said clock pulses input to said N converter means and said means for producing an output pulse for synchronizing the operation of said N converter means with the operation of said means for producing an output pulse.

2. The apparatus of claim 1 wherein said second means for producing an output pulse includes multivibrator means and wherein said memory means has a second portion for storing a program for producing said output pulse, said processor means being responsive to said second portion of said memory means for performing the program to produce said output pulse, said multivibrator means receiving said output pulse and said clock pulses.

3. The apparatus of claim 1 wherein said second means for producing an output pulse includes a second portion of said memory means for storing a program for producing said output pulse, said processor means being responsive to said second portion of said memory means for performing the program to produce said output pulse, said second means for producing an output pulse additionally including an OPR buffer means for receiving said output pulse, an OPR converter means responsive to said OPR buffer means and said clock pulses for synchronizing said output pulse, and OPR filter means responsive to said OPR converter means for filtering said output pulse.

4. The apparatus of claim 1 wherein said first means includes input means for inputting new values of the parameters of the equation into said memory means.

5. The apparatus of claim 1 wherein said clock pulses have a frequency equal to the number of samples per revolution times the number of revolutions per second.

* * * * *